(12) United States Patent
Fraccaroli

(10) Patent No.: US 9,286,610 B2
(45) Date of Patent: Mar. 15, 2016

(54) METHOD AND APPARATUS FOR A PRINCIPAL / AGENT BASED MOBILE COMMERCE

(76) Inventor: Federico Fraccaroli, Irving, TX (US)

(*) Notice: Subject to any disclaimer, the term of this patent is extended or adjusted under 35 U.S.C. 154(b) by 607 days.

(21) Appl. No.: 13/541,737

(22) Filed: Jul. 4, 2012

(65) Prior Publication Data

US 2014/0011515 A1 Jan. 9, 2014

(51) Int. Cl.
*H04W 24/00* (2009.01)
*G06Q 30/00* (2012.01)
*H04L 29/08* (2006.01)
*H04W 4/02* (2009.01)

(52) U.S. Cl.
CPC .............. *G06Q 30/00* (2013.01); *H04L 67/306* (2013.01); *H04W 4/023* (2013.01)

(58) Field of Classification Search
CPC ............................ H04L 67/306; H04W 4/023
USPC ................. 455/456.1, 456.2, 456.3
See application file for complete search history.

(56) References Cited

U.S. PATENT DOCUMENTS

| | | | |
|---|---|---|---|
| 6,539,232 B2 | 3/2003 | Hendrey | |
| 6,542,750 B2 | 4/2003 | Hendrey | |
| 6,549,768 B1 | 4/2003 | Fraccaroli | |
| 6,819,919 B1 | 11/2004 | Tanaka | |
| 7,203,502 B2 | 4/2007 | Wilson | |
| 7,715,542 B2 | 5/2010 | Anson | |
| 7,970,912 B2 | 6/2011 | Bourne | |
| 8,005,488 B2 * | 8/2011 | Staffaroni et al. | 455/456.2 |
| 8,019,692 B2 | 9/2011 | Rosen | |
| 8,050,688 B2 | 11/2011 | Jacob | |
| 8,275,361 B2 | 9/2012 | De Vries | |
| 2002/0132627 A1 | 9/2002 | Ichihara | |
| 2009/0249456 A1 | 10/2009 | Malas | |
| 2010/0159943 A1 | 6/2010 | Salmon | |
| 2011/0136510 A1 * | 6/2011 | Peterson et al. | 455/456.3 |
| 2011/0137796 A1 * | 6/2011 | Tullis | 705/44 |

* cited by examiner

*Primary Examiner* — Muthuswamy Manoharan
(74) *Attorney, Agent, or Firm* — Federico Fraccaroli

(57) ABSTRACT

According to one embodiment of the present invention, a principal/agent method for mobile commerce is presented wherein mobile users receive indicia that agent equipment is in proximity wherein said indication is conditional to preferences and settings contained in a data structure determined, at least in part, by a principal.

20 Claims, 9 Drawing Sheets

Principal Agent Data Structure
200

| ID Agent (209) | Principal (210) | Status Princ. (211) | Status Agent (212) | Entry (213) | Offer (214) | Parameters (215) | Location (216) |
|---|---|---|---|---|---|---|---|
| JPR-123 | Watches International (WI) | Inactive | Active | IP Address/ Web page | 25% off a WI wrist watch model Tango. | • Only military personnel.<br>• Valid only in Texas<br>• Distance between agent equipment and user equipment less than 1000 feet — 217 | Closest WI dealer to the place where match has occurred. (Server software may determine closest dealer that has the item available and provide location and routing to user). — 221 |
| JPR-234 | | Active | Active | | | | |
| RJA-123<br>RJA-176<br>RJA-735 | Jeep dealer located at Lat. / Long. or address | Active<br>Active<br>Inactive | Inactive<br>Active<br>Active | IP Address/ Web page | 3000$ off Jeep Wrangler | • Offer valid 1-5-2012 to 3-5-2012<br>• Time 8am -5 Pm — 218 | • Jeep dealer located at Lat./ Long. or address — 222 |
| N453 | Law offices located at Lat. / Long. or address | Active | Active | IP Address/ Web page | Law Firm Services. Uncontested divorce. 50% off | • Offer received only by users located within geofenced area (4 Lat and Long points defining area) 219 | • Law offices located at Lat. / Long. or address |
| XYZ-6634 | Computer Store. GPS: Lat. / Long. or address | Active | Active | IP Address/ Web page | 30% off on all 2011 laptops D2011 | • At least 15 accepted purchases<br>• Max 30 accepted purchases — 220 | • Computer Store; GPS: Lat. / Long. or address |

FIG. 2

User Data Structure: 300

| Target Preferences 310 | Details of Target Preferences 320 | User data 330 | User Preferences 340 |
|---|---|---|---|
| CAR | Mercedes: new Class M | ID user : RTF 176234<br>Student: No<br>Marital status: Single<br>Date of Birth 12/23/1968 | Time restrictions: No notifications are to be sent between 11pm - 8am local time. |
| | Fiat: new cinquecento | Gender: M | Location restrictions: Send offers only within Dalllas city limits.<br><br>Meeting places preferences. |
| | BMW: new 3 SERIES | Income > than 50,000 $ | Only offers where good is in the hands of the agent and can be showcased. |
| WATCH | International Watches | Military: N | Only discounts above 30 % |
| SMART PHONE | New Android Phones | Geo Patterns in time and space | KEYWORDS: Gucci; Armani |
| SERVICES - LEGAL | Family Law / Divorce | Matches, exclusions and ratings. | Privacy and preferences settings. |

FIG. 3

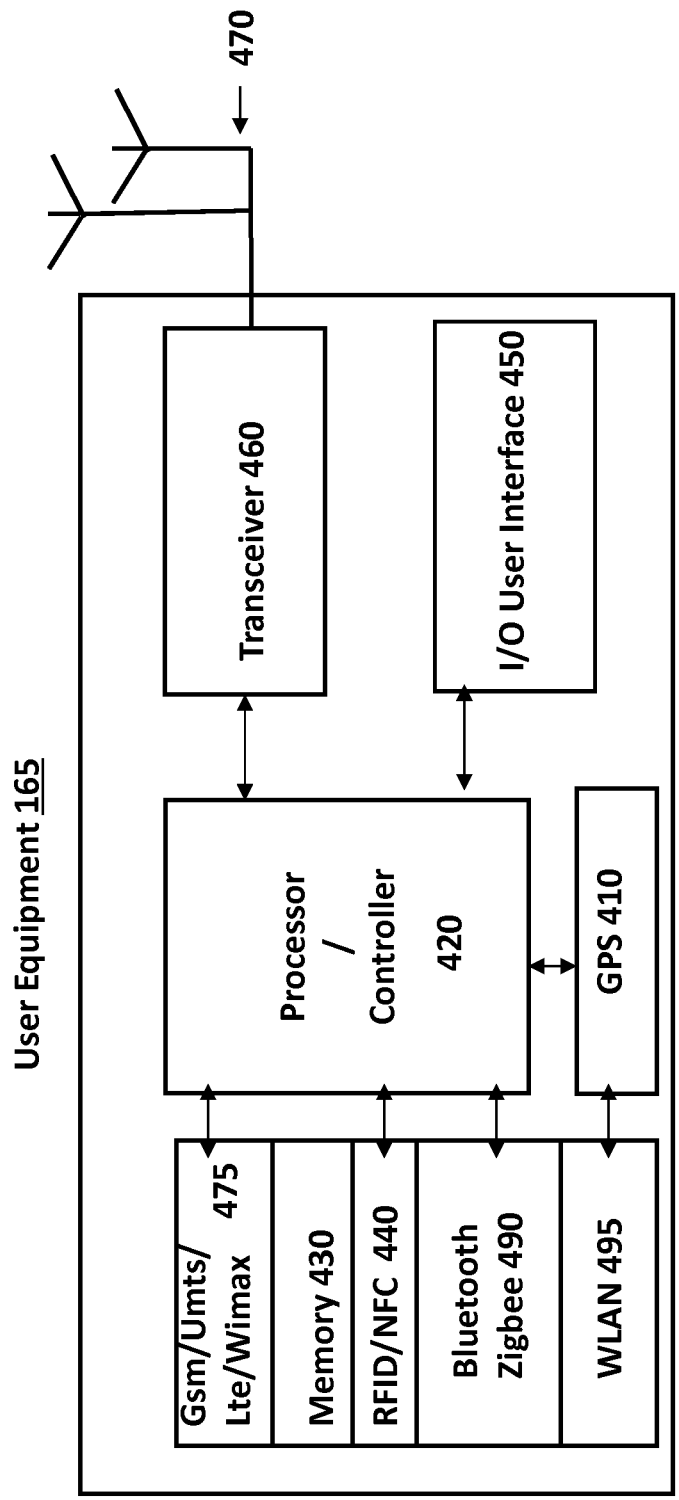

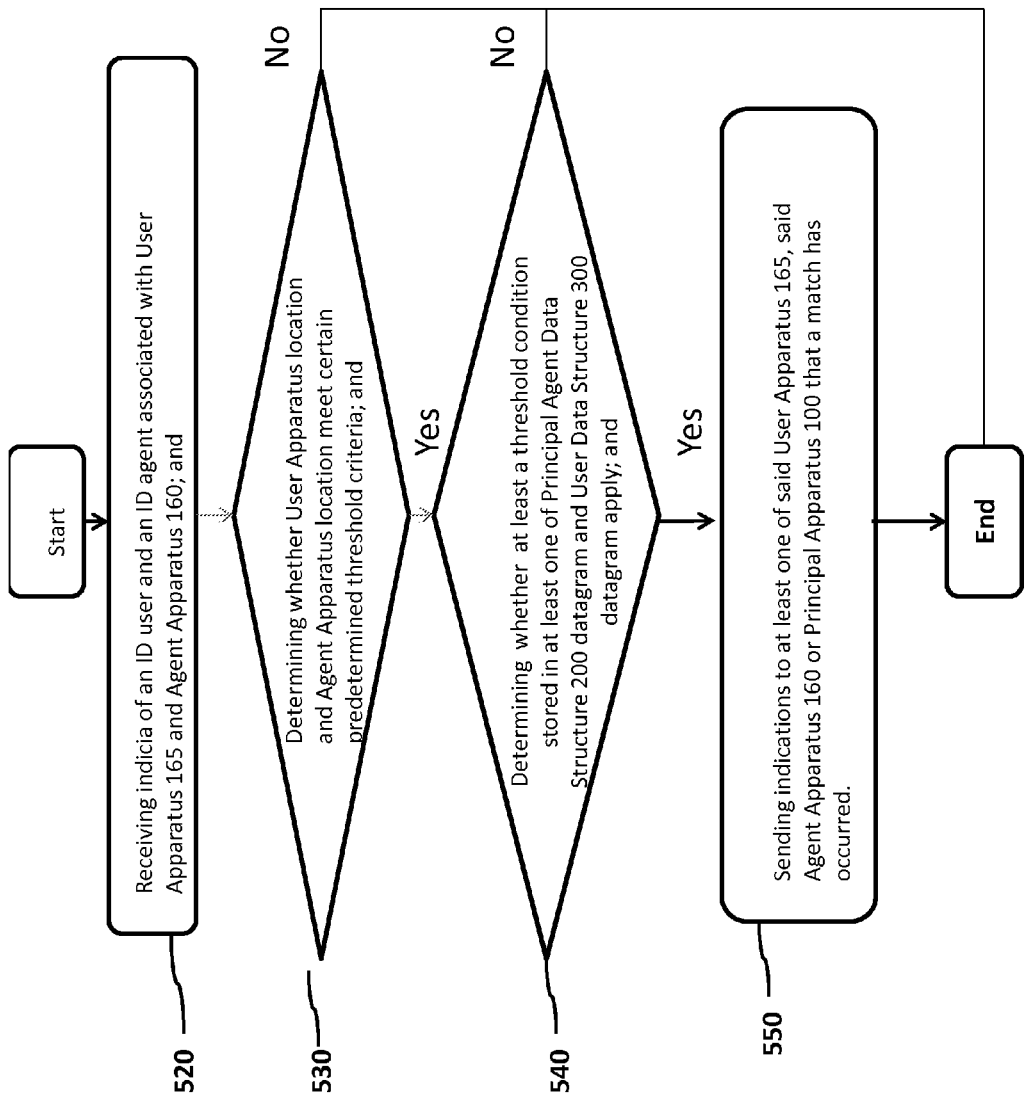

METHOD AND APPARATUS FOR A PRINCIPAL / AGENT BASED MOBILE COMMERCE

TECHNICAL FIELD

The present application relates generally to electronic commerce.

BACKGROUND

A contract to be made by an agent on behalf of a principal is considered to be the contract of the principal and not that of the agent. It allows the principal to approve somebody to carry out her duties, either for a precise purpose or generally (i.e., to conduct transactions). The agency relationship is typically entered into by informal agreement, but also can occur by formal agreement (in certain cases, the agency affiliation must be specified in writing).

The current wireless and locationing technologies, with their improved speed of data and location capabilities provide new opportunities for business growth by enhancing integration between business with physical premises and internet based commerce. General wireless technologies such as cellular, WLAN, Bluetooth, ZigBee, RF-ID and other positioning technologies like GPS, databases mapping base stations and access point, multilateration and other technologies provide a method for taking advantage of proximity between users of wireless devices.

A geo-fence is a virtual perimeter for a real world geographic area. A geofence can be dynamically generated as in a radius around a point location that could be stationary or mobile. A geofence can be a predefined set of boundaries connecting points expressed by latitude and longitude, like neighborhood boundaries. Geofencing has been made possible by the introduction of locationing techniques like, for example, the GPS (Global Positioning System) technology or the multilateration technology and the miniaturization of electronic components that have made the GPS a standard feature in mobile phones and portable electronics in general (User Equipment).

SUMMARY

Various aspects and examples of the invention are set out in the claims. According to a first aspect of the present invention, a method comprises receiving an indication that a user equipment has received a wireless digital identifier signal associated to an agent equipment because of at least a location criteria associated to the location of said agent equipment in relation to said user equipment and sending to said user equipment indicia of whether said wireless digital identifier signal belongs to an entry in a data structure predetermined, at least in part, by a principal equipment.

According to a second aspect of the present invention, a method comprises broadcasting by an agent equipment a wireless digital identifier to an user equipment wherein said wireless digital identifier belongs to an entry in a data structure predetermined, at least in part, by a principal equipment and said entry is associated with information that a principal wants to share with a user based upon, at least in part, the location of said user equipment and said agent equipment.

According to a third aspect of the present invention, a user apparatus comprises a receiver configured to receive a wireless digital identifier signal based upon, at least in part, the location of said user apparatus and of an agent apparatus and further configured to receive an indication of whether said wireless digital identifier signal belongs to a data structure predetermined, at least in part, by a principal equipment; and an indicator configured to indicate an entry in said predetermined data structure corresponding to said wireless digital identifier signal, wherein said entry is associated with digital information that a principal wants to share.

According to a fourth aspect of the present invention, a user apparatus comprises at least one processor; and at least one memory including computer program code; the at least one memory and the computer program code configured to, with the at least one processor, cause said user apparatus to receive a wireless digital identifier signal related to an agent apparatus and trigger an indication that said wireless digital identifier signal belongs to a data structure predetermined, at least in part, by a principal equipment wherein said indication is conditional, at least in part, upon at least a location criteria associated with the location of said agent apparatus in relation to said user apparatus.

According to a fifth aspect of the present invention, a method comprises receiving an indication that certain conditions associated to the location of both a user apparatus and an agent apparatus meet a location criteria associated with the location of said agent apparatus in relation to said user apparatus; and determining whether a wireless digital identifier associated with said user apparatus and a wireless digital identifier associated with said agent apparatus belong to a data structure that is populated, at least in part, by receiving data information from a principal apparatus, wherein said data structure further comprises data information to be sent to at least said user apparatus for the purpose of evaluating a business proposal.

BRIEF DESCRIPTION OF THE DRAWINGS

For a more complete understanding of example embodiments of the present invention, reference is now made to the following descriptions taken in connection with the accompanying drawings in which:

FIG. 2 provides an example of a data structure in accordance with an embodiment of the present invention; in this example the data structure related to a principal's entries and settings and the data structure related to an agent's entries and settings are merged. The person skilled in the art may see this figure as the merging of two profiles.

FIG. 3 provides an example of a user data structure in accordance with one embodiment of the present invention.

FIG. 4 is a schematic and exemplary illustration of a user apparatus, or alternatively, an agent apparatus in accordance with an embodiment of the present invention.

FIG. 5 is a flow diagram illustrating a process for determining whether an ID agent and an ID user meet certain threshold conditions contained in predetermined data structures so that data information controlled by a principal is sent to a user.

DETAILED DESCRIPTION OF THE DRAWINGS

An example embodiment of the present invention and its potential advantages are understood by referring to FIG. 1 through FIG. 9 of the drawings.

Figure 1:
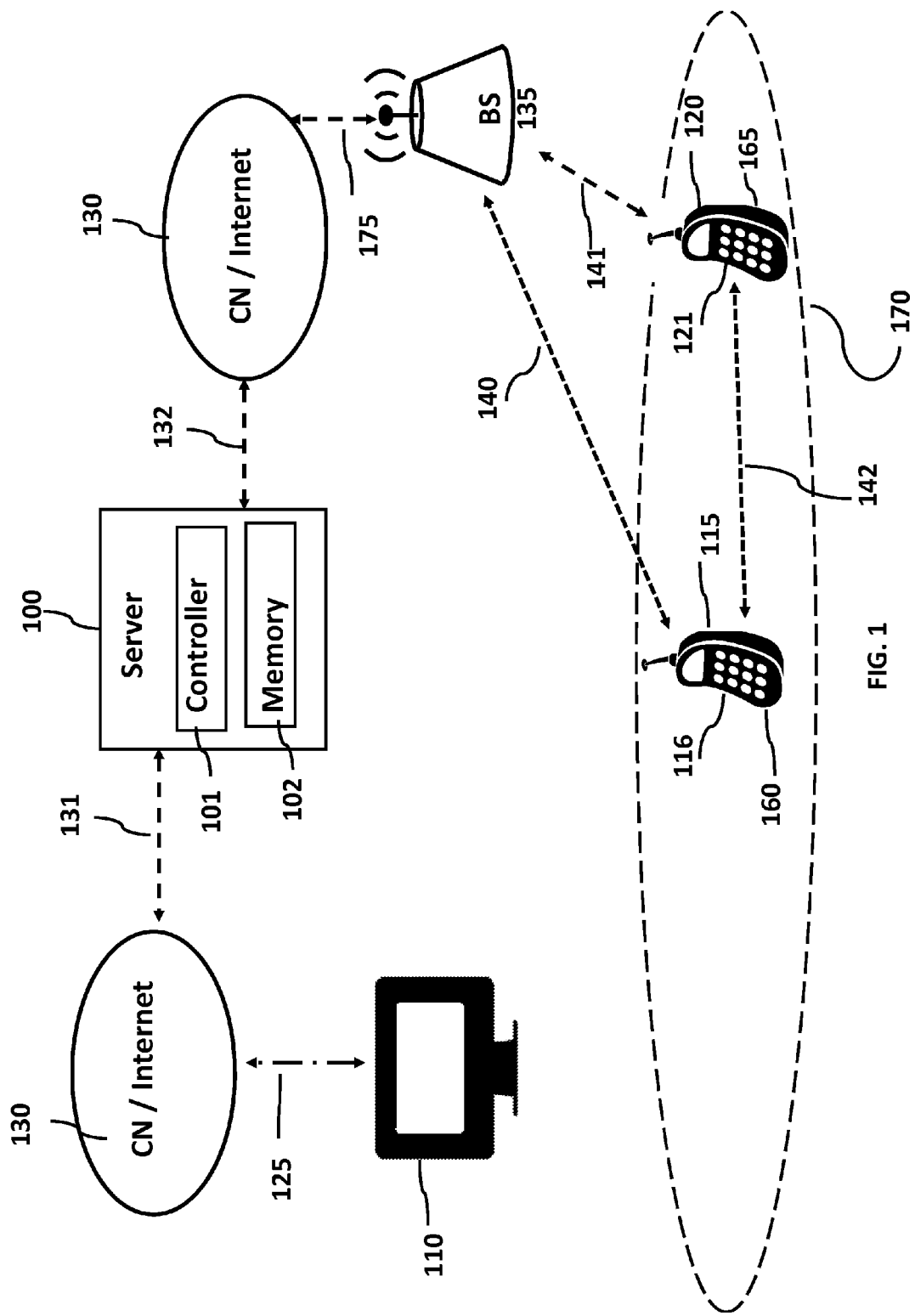
FIG. 1 describes an example system in accordance with an embodiment of the present invention based on a radio carrier distance.

FIG. 1 represents one example embodiment of the invention based on a wireless radio carrier such as a wireless local area network system (WLAN). The person skilled in the art may recognize that WLAN is only one example and a multitude of different radio standards and carriers are possible substitutes. According to this embodiment, an Agent Equipment 160 carried by an agent, includes a Memory 115 wherein an application is stored and is running. Said Agent Equipment may further comprise an Input-Output Module 116 adapted to show indications of any match that may have occurred and further adapted to input any data or preference an agent may have. User Equipment 165 carried by a user, includes a Memory 120 wherein an application is also stored and is running. Said User Equipment 165 may further comprise an Input-Output Module 121 adapted to show indications of any match that may have occurred and further adapted to input any data or preference a user may have. Some examples of data, decisions and preferences will be described in relation to FIG. 3. In this embodiment, the Radio Range Area 170 of the WLAN radio carrier results in an area in which the agent carrying Agent Equipment 160 can engage a user. The person skilled in the art will appreciate that such area may vary according to the radio carrier of choice or the radio propagation status. In this implementation, a proximity between an agent and a user may be determined by the radio horizon or the radio propagation range of non-cellular radio carriers such as WLAN, Bluetooth, Zigbee or RF-ID.

In FIG. 1, User Equipment 165 and Agent Equipment 160 could be a mobile phone, a PDA, a laptop, or tablet or any other wireless mobile device or wearable equipment. In a basic embodiment, Agent Equipment 160 can be a simple RF-ID sending out a wireless digital identifier. In this example embodiment, user equipment 165 is connected through a Cellular Link 141 to base station BS 135. BS 135 could be a Code Division Multiple Access (CDMA) and its variants, a Global System for Mobile Communications (GSM), Universal Mobile Telecommunications System (UMTS), Long Term Evaluation (LTE), WLAN or a WiMAX base station.

BS 135 and its related network can be compliant to 3GPP, 3GPP2, or WiMAX specification. In an example embodiment, BS 135 is connected through Interface 175 to Core Network (CN)/Internet 130. CN/Internet 130 may connect or allow connection to server 100 using Interface 132. Interfaces or data connections 175, 132 can be wireless or wired connections.

A wireless digital identifier (ID agent) may be sent via an Interface or Data Connection 142 (for example, WLAN) from Agent equipment 160 to User Equipment 165 wherein an application, stored in Memory 120, is running. Said application may cause said wireless digital identifier (ID agent) to be sent to Server 100, together with a wireless digital identifier associated with the user of User Equipment 165 (ID user), via Cellular Link 141 to base station BS 135 and from there via Interfaces or data connections 175, 132 and Core Network (CN)/Internet 130 to said Server 100.

In a possible implementation, Server 100 will pair ID agent with ID user and probe for possible matches using the data structures that will be described in FIG. 2 and FIG. 3.

In another implementation, it is User Equipment 165 that sends ID user to Agent Equipment 160 via an Interface or Data Connection 142 wherein an application, stored in Memory 115 is running. Said application will cause both ID agent and ID user to be sent over to Server 100 via Cellular Link 140 and the various data connections described in the previous example. Again, an algorithm running on Server 100 may pair ID agent with ID user with the associated datagram and query for possible matches.

In another implementation, the sending of the IDs may not be necessary, as a database of wireless digital identifiers, data structures and matching algorithm can be already stored in Memory 120 or Memory 115. Said data could be updated from time to time via a wired or wireless connection to a Server 100.

FIG. 1 shows a simplified description of Server 100 comprising a controller 101. Server 100 may comprise a plurality of controllers 101 and Memories 102 and other components that would allow a server to operate as is commonly known in the art. In one implementation Server 100 via Controller 101 may check the digital identifier that User Equipment 165 has received from Agent Equipment 160 against a database contained in Memory 102 and determine if certain conditions and parameters as the ones described in FIG. 2, FIG. 3 and FIG. 9 as examples are met. In this implementation, Principal Equipment 110 is represented as fixed equipment or a desktop but the person skilled in the art will recognize that Principal Equipment 110 is not limited to desktop-type devices but can also be any mobile or wearable device capable of connecting to Server 100 to modify entries in a datagram structure as the one described for example in FIG. 2.

In some scenarios, Principal Equipment 110 may not even belong to the person acting as a principal. A principal can in fact control the terms and conditions of a business offer via instructions, data and terms uploaded on Memory 102 of Server 100 by means of any equipment capable of connecting to Core Network (CN)/Internet 130. These instructions can be uploaded via Interfaces or Data Connections 125, 131 and Core Network (CN)/Internet 130. These connections can be wireless or wired connections; a base station or access point (not shown in FIG. 1 in relation to Principal Equipment 110) would be necessary in the case of a wireless connection to connect Principal Equipment 110 to Server 100.

FIG. 1 shows only one Principal Equipment 110 controlled by a person acting with the capacity of a principal, however, a plurality of different principals may exist which are all connected to server 100. A plurality of principals may submit offers to other users, such as the one depicted in FIG. 1, carrying hardware similar to User Equipment 165 via other agents, as the one depicted in FIG. 1, carrying hardware similar to Agent Equipment 160.

In one scenario, Principal Equipment 110 may represent and be used by a business entity, a principal, who wants to display his latest product via a testimonial such as an enthusiastic previous client for example. Such client will act as an agent and will be carrying around Agent Equipment 160 and a product that principal wants to sell. For example, a car dealer could be a principal and an enthusiastic client might be authorized by such dealer to become an agent for the dealer. The agent may carry around a new car and advantageously display and advertise the product to potential clients by means of the present invention.

In a possible implementation, when User Equipment 165 is within Radio Range Area 170, both user and agent (and even principal) can be alerted that a match has occurred. User of User Equipment 165 can accept the invitation for the product demonstration via Input-Output Module 121. All these data and information can be sent over Cellular Link 141, 140, Interfaces or Data Connections 175, 132, 131, 125, 142 and Core Network (CN)/Internet 130. In a possible implementation, User Equipment 165 may also receive data facilitating the meeting with the agent, for example via compass-like element indicated by Output Module 121 displaying an arrow pointing at the agent's position, or via turn-by-turn instructions that will guide user to the agent. In a possible implementation, pictures of the agent and the user may also appear via Input-Output Module 121 and Input-Output Module 116 to facilitate the identification of the agent and the user by the other party. Alternatively, if user accepts the prompt for a meeting with an agent, it can be Agent Equipment 160 receiving data facilitating the meeting. In one possible implementation if user accepts the prompt for a meeting an algorithm running on Server 100 may provide both Agent Equipment 160 and User Equipment 165 with data and instructions in order to reach a conveniently located meeting place. Said places could be commercial places such as bars or restaurants that for a fee can become the default or sponsored places where the system can route agents and users. On those premises, said users and agents can possibly enjoy the services and the personalized offers made by said commercial establishments.

In one implementation, once user and agent have exchanged information about the product, user may, via Input-Output Module 121, decide to accept the offer. Said acceptance can be preliminary or final. User Equipment 165 may send said acceptance information to Server 100 and from there Principal Equipment 110 could retrieve it. If the acceptance is preliminary user may be given only a limited amount of time, a grace period, to take advantage of the offer he has received via the agent, go to the business premises of principal, finalize the acceptance and collect the good or services he has purchased, for example a car.

The person skilled in the art will recognize that many variations do exist to the approaches described. For example, the offer may have restrictions such as a minimum number of users preliminarily accepting it. Alternatively, an agent may have some goods with him and payments and transactions of goods may already occur during the interaction between agent and user.

In a possible implementation, principal has a great deal of control over not only the content and conditions of the offer but also over the modalities by which Agent Equipment 160 may operate in relation to the principal-agent mechanism that has been described. For example, a principal may restrict the broadcasting of the wireless digital identifier to certain time windows during the day or to determined locations. A principal may also render Agent Equipment 160 active or inactive, modify certain parameters and data as described in FIG. 2 and, in case of multiple agents working for the same principal, the principal could also create hierarchies among agents so that the probability of agents interfering with each other will be minimized. For example, there could be times when more than one Agent Equipment 160 will be able to engage the same User Equipment 165; in that case, a default agent equipment may be given priority in order to minimize the conflicts; perhaps priority can be given to the agent who has the most successful record of accomplishment in closing the deals.

In addition, in case of multiple agents and multiple users in the same area having profiles that could be causing multiple alerts or invites to meet, the algorithm contained in Memory 102 and running on Server 100 may distribute and rebalance the load among agents according to a range of principal's preferences. The principal may input these preferences by means of a Principal Equipment 110 and send these preferences and settings over to Server 100. Alternatively, a fourth entity, in addition to the principal, the agent and the user, namely a business entity running the principal-agent service and having access to Server 100 which is hosting the matching algorithm, can define the details of said algorithm and manage any possible conflicts and interferences.

FIG. 2 provides an example of a Principal Agent Data Structure 200 in accordance with an embodiment of the present invention. The person skilled in the art may recognize that FIG. 2 can be seen as the combination of two data profiles, one belonging to a principal and one, more restricted since the principal is the master of the offer, belonging to an agent. The present invention, in one implementation, can be seen as the matching of three profiles. The agent's profile can be limited to simple data fields indicating the decision by the agent to turn on or off the application running on his mobile. For example, an entry in the Principal/Agent Data Structure 200 will indicate that the agent is active (Column 212). In other implementations, the agent's profile could be more sophisticated and allow the agent to set some preferences such as a preferred meeting place or other. In a possible embodiment, the preferred meeting places allocation could be a possible source of revenues for a principal, an agent or the entity overseeing the principal-agent service and having access to Server 100. By routing users to commercial premises for the demonstrations, the entity running the principal-agent service could for example take advantage of possible agreements with the owners of the commercial properties such as bars.

In one example embodiment, the data structure in FIG. 2 is downloaded over the air (OTA) into User Equipment 165 or Agent Equipment 160 via an internet connection. Server 100 may also update the Data Structure 200 over the air (OTA). In another embodiment, said data structure may reside on Memory 102 of Server 100 and can be modified and updated directly by principal via Principal Equipment 110 or Agent Equipment 160 or, as discussed, by accessing secure web pages by using equipment capable to connecting to Core Network (CN)/Internet 130. In an embodiment, Agent Equipment 160 and User Equipment 165 may establish a connection with Server 100 via Cellular Link 141, 140 to base station BS 135 and from there via Interfaces or Data Connections 175, 132 and Core Network (CN)/Internet 130, retrieve, and send the information and data needed. In this embodiment, a matching algorithm stored on Memory 102 may be overseeing all the functionalities necessary to ensure that user of User Equipment 165 receives a notification when he is located within Radio Range Area 170 and his associated profile satisfies the conditions required for such notification. In another embodiment, the matching algorithm could be stored and be running either on a memory in User Equipment 165 or in a memory in Agent Equipment 160.

In the embodiment described in FIG. 2, Rows 230, 240 250 and 260 represent essentially data and information that are pertinent to the various principals, namely the entities that are in control of the offers. For example, with reference to Row 230, the principal is Watches International and the wireless digital identifiers, contained in Column 209, associated to its agents are JPR-123 and JPR-234. Column 210 may contain all the principals in control of the different offers. In this embodiment JPR-123 is an ID (wireless digital identifier or ID agent) that is associated and identifies mobile equipment, such as Agent Equipment 160, that can be carried around by an agent who has entered into an agreement with Watches International. In this example, Watches International has created and registered two agents. In another embodiment, the ID agent can be just associated with a particular agent carrying Agent Equipment 160 but the equipment may be interchangeable. In this case, the agent may have to log in into an application running on mobile equipment with a special login and password. The person skilled in the art will recognize that by virtue of a possible log in mechanism, agent and users may use different equipment as long as they run an application similar to the one contained in Memories 115 and 120 enabling the functionalities described in this application.

In the example of FIG. 2, Column 211 contains the status of the agents as determined by the principal. For example, agent JPR-123 has been turned to the status of "inactive" by the principal, Watches International, as the principal may desire that agent JPR-123 be excluded by the roster of active agents. Column 212 contains the status of the agents as determined by the agents. For example, agent RJA-123 in Row 240 has turned his status to "inactive" in Column 212 since he may want to exclude himself from the roster of active agents, even temporarily. In this example, an agent to be active must have his "status as determined by the agent" (Column 212) and his "status as determined by the principal" (Column 211) both in the active state as, for example, agent JPR-234.

In this example, the principal controls the data in Column 213. This column contains a web address pointing at content that a User Equipment 165 can display to a user after he is notified that an agent is in proximity. A notification to a user may occur only if the offer meets the parameters and conditions contained in the data structures described in FIG. 2 and soon to be described FIG. 3. The webpage may contain the details of the product, the offer and the conditions attached to the offer. The webpage or the application client running on User Equipment 165 may also contain acceptance buttons and triggers. For example, once agent and user meet in person and the agent has explained the details of the product verbally to the user, said user may indicate that he is interested in the offer; if the transaction occurs, agent should be credited for the sale. In one possible scenario, after the user indicates his preliminary acceptance via an "acceptance button" in the application client or a webpage, he may have a period in which to go in person to the principal's location and pick up the goods or consume the service offered via the agent. After a set period has expired, the offer may time out and it may not be available to user anymore. In that case, agent may not be credited for the transaction.

Column 214 contains a summary of the offer. The person skilled in the art will recognize that different scenarios are possible. For example, a principal can make more than one offer. Alternatively, a principal can assign different offers to different agents. In another possible scenario, an agent may represent more than one principal.

Column 215 includes restrictions that a principal may impose upon users. For example, Field 217 includes a geographical restriction and a class restriction, "only military personnel'. Field 217 may affect the matching of certain offers with certain users if those users do not conform to the restrictions imposed. Field 218 gives an example of a temporal restriction. A temporal restriction could also be the imposition of a set time window in during the day when users in proximity to agents can receive an offer. Field 219 represents another geographical restriction that a principal may impose upon users and agents. In this example, users will be able to receive alerts and notifications about proximity only within a predefined geographical geofenced area. Another example could be the setting up of exclusion areas. For example, principals may set up exclusions areas. Users may not be able to receive alerts if within a specified area; (or agents may not be able to be matched with users if within the area.) Field 220 represents an example of additional restrictions that a principal may impose. For example, an offer may not be valid unless at least fifteen users have accepted, at least preliminarily, said offer. In addition, a principal may set up a maximum number of offers that can be accepted by users. Once a maximum number of offers have been accepted, notifications of additional offers to users may be barred. This function may be particularly useful when principal uses more than one agent and the inventory of goods or the availability of services that can be offered is limited.

Column 216 provides the location of the various principals. In certain business models, it can be advantageous that the good or the service is delivered at the principal's location to a user when said user preliminarily accepts the offer tendered by an agent by means of an application running on his User Equipment 165. In certain implementations, the application may point to the closest dealer carrying the item, in this case a watch, as described by Field 221. In this implementation, the principal could be the owner of the particular brand of watches and to him it may not matter which of his dealers will be closing the sale. In another implementation, an algorithm that may be running in Server 100 may point the same user to a specific dealer using the dealer's location or the level of items on inventory as parameters. In other implementations, the application may point to a specific dealer or shop as described in Field 222. In this case, the principal could be that specific dealer or a particular shop that would honor the offer, not the brand owner. In one implementation, the application running on User Equipment 165 may provide directions to the principal's place of business. In other implementations, an algorithm running on server 100 may choose a particular dealer according to certain parameters such as the distance between user's home and the closest dealer and provide directions to said dealer to User Equipment 165.

FIG. 3 provides an example of a User Data Structure 300 in accordance with one embodiment of the present invention. As in the case explained for FIG. 2 the User Data Structure 300 may have been downloaded over the air (OTA) or via an internet connection into User Equipment 165 and Agent Equipment 160. Server 100 may also update User Data Structure 300 over the air (OTA). In another embodiment, said data structure may also reside on Memory 102 of Server 100 and can be modified and updated by user via User Equipment 165 or via any computer accessible to user and securely connected to Core Network (CN)/Internet 130 (not represented in FIG. 1).

Fields 350, 360, 370 and 380, all contained in Column 310, represent essentially data and information that are pertinent to categories of good and products of interest to user of User Equipment. Column 320 may contain more specific details within the broad category of services and goods that may interest a specific user. In one possible implementation, the user can populate these fields via a drop-down list. A drop down list is a user interface control element ("widget" or "control"), similar to a list box, which allows a user to choose one value from a list. In this implementation, the various principals may control the values in these drop-down lists and these values will structure their agents' offerings and user's possible elections.

Column 330 may consist of a data field pertaining to the user such as gender, income, social categories that the user himself may fill up or chose from a drop down lists. In particular, Data Field 354 may contain a wireless digital identifier (ID user) unique to User Equipment 165 or unique to user of User Equipment 165; in this case, user may have to log in into the application with his login data and password as previously noted. Other data fields, such as Field 372, may collect and store information pertaining to patterns of the user in time and space without the user's intervention so that, for example, it may be possible to predict where certain users could be at certain times. Agent, principals and the business entity running this service may use this information to build maps indicating clouds of spatial and time probability for various typologies of users. These clouds may represent probabilities of where certain users could be located at various times of a day on certain days of the week.

Data Field 381 may contain data records of the matches that have occurred in time and space and records of whether the user has chosen to pursue a proposed meeting with an agent. In one possible implementation, users may also rate agents after the meeting has occurred and those data may be available to principal. Data Field 381 may also contain exclusions, namely particular agents or particular offers that a user may decide not to pursue in the future.

Column 340 contains user preferences. For example, Data Field 353 may contain restrictions pertaining to time windows during the day in which a match should never occur. Data Field 352 may contain restriction pertaining to locations where a match should never occur. For example, it could be inconvenient to receive matches when at work or at home. Data Field 351 may contain restrictions pertaining to the offer. For example, unless the good is with the agent and the user will be able to see it during the meeting a match and a notification should not occur. Data Field 361 may contain restrictions pertaining to the level of discount a user may get if he decides to pursue the opportunity offered by the agent. Certain users may decide that they want to receive notifications only for goods or services at a deep discount. Data Field 371 may contain keywords for products of particular interest to the user. These keywords could be used to trigger matches for particular offers.

Data Field 382 may contain privacy and other various preference settings. For example, user may choose which data the algorithm should use to produce the matching or which personal data can be displayed to agent or others. In another implementation, Data Field 381 may also contain preferences such as public places and commercial establishments that the matching algorithm, in one possible implementation running on server 100, may use to suggest a convenient meeting place for agent and the user to interact. For example, user may prefer certain coffee shops as meeting places so the algorithm may indicate as a meeting place a particular coffee shop conveniently located between agent and user after a match has been obtained, communicated and accepted by both, agent and user. In one possible implementation, the algorithm may also guide user and agent to the meeting place.

FIG. 4 provides a schematic example of a User Equipment 165 apparatus in accordance with an embodiment of the present invention. In a possible implementation, User Equipment 165 and Agent Equipment 160 are substantially similar and the following description of User equipment 165 is applicable to Agent Equipment 160 as well. In addition, Principal Equipment 110 can be a mobile equipment as well and the same description may apply. As discussed, the using of a login and a password to access and run an application running on mobile equipment makes said equipment interchangeable.

User Equipment 165 is a general example of a terminal device that users can operate. It could be a traditional mobile phone, a personal digital assistant, a laptop computer, an e-book reader, an entertainment console or controller, wearable hardware such as augmented reality headsets, a tablet computer or any other equivalent portable device that may be used to communicate with other devices or with a server. Principal equipment can instead be portable or fixed. User Equipment 165 can include at least one Processor 420 and at least a Memory 430 including computer program instructions. The at least one processor 420 can be embodied by any computational or data processing device, such as a central processing unit (CPU) or application specific integrated circuit (ASIC). The at least one processor 420 can be implemented as one or a plurality of controllers.

Memory 430 may contain an application software running in User Equipment 165. The memory 430 may also contain at least a portion of Principal-Agent Data Structure 200 or User Profile 300 as discussed in FIG. 2 and FIG. 3. The at least one Memory 430 can be any suitable storage device, such as a non-transitory computer-readable medium. For example, a hard disk drive (HDD) or random access memory (RAM) can be used in the at least one Memory 430. The at least one Memory 430 can be on a same chip as the at least one Processor 420, or may be separate from the at least one Processor 420. The computer program instructions may be any suitable form of computer program code. For example, the computer program instructions may be a compiled or interpreted computer program. The at least one Memory 430 and computer program instructions can be configured to, with the at least one Processor 420, cause a hardware apparatus (for example, user equipment 165) to perform any process described herein.

User Equipment 165 may include a Radio Frequency Identification (RFID) and/or a Near Field Communication (NFC) Module 440 with an antenna (not shown). The RFID/NFC Module 440 may operate using traditional RFID frequencies or NFC frequencies. In one implementation these RFID/NFC Modules 440 contained in User Equipment 165 and Agent Equipment 160 may send a wireless digital identifier, ID agent, and a wireless digital identifier, ID user, to the same RFID reader located in the same premises, a bar for example. An algorithm located on Server 100 may infer the proximity of the agent associated with ID agent and the user associated with ID user. An algorithm residing on Server 100, can associate these IDs to the data structures described in FIG. 2 and FIG. 3 and, if a match occurs, may trigger a notification via a display on the premises accessible to both user and agent or via radio notifications to their mobile equipment.

User Equipment 165 may also include an I/O User Interface 450. I/O User Interface 450 may allow inputting information via a touch screen or a QWERTY keyboard. I/O User Interface 450 may also include a vibrating notification module, a speaker or a monitor (or any combination thereof). User Equipment 165 may also include one or more Transceiver 460 configured to operate in conjunction with one or more Antenna 470 to communicate wirelessly. In one embodiment, the Antenna Unit 470 may support beam forming and/or multiple input multiple output (MIMO) operations. As is known to those skilled in the art, MIMO operations may provide spatial diversity, which is to overcome difficult channel conditions and/or increase channel throughput. The Antenna 470 may include antenna tuning and/or impedance matching components, RF power amplifiers, and/or low noise amplifiers. User Equipment 165 can be optimized to support multiple transceivers using multiple wireless standards.

In one example embodiment, User Equipment 165 may support simultaneous transmission of cellular (for example, GSM/UMTS/LTE/WiMAX) and non-cellular (for example, WLAN 495 or Bluetooth®/ZigBee 490) radio carriers. A Transmission Module GSM/UMTS/LTE/WiMAX 475 could be the medium by which User Equipment 165 and Agent Equipment 160 communicate with Server 100.

In one possible implementation, a GPS Module 410 may provide the location of User Equipment 165 and the location of Agent Equipment 160 to Server 100 via Data Link 140 and Data Link 141. The algorithm residing on Server 100, may associate the IDs of both Agent Equipment 160 and User Equipment 165 to the data structures described in FIG. 2 and FIG. 3 and may also calculate the distance between agent and user. If the distance between user and agent is below a predetermined threshold and the conditions imposed by said data structures are met, said algorithm may trigger a notification to be sent to at least one of User Equipment 165 and Agent Equipment 160.

As discussed, the locationing component of the invention can be advantageously implemented in many different ways. When in closed environments, such as a shopping mall, the location data can be provided by different techniques. For example, choke points or grids, namely location indexing and presence reporting for tagged objects, can be used to provide location data when indoor. Other examples of techniques used to provide location are angle of arrival, time of arrival, received signal strength indication and inertial measurements.

FIG. 5 is a flow diagram illustrating a method for determining whether an indication should be sent to at least one of User Apparatus 165, Agent Apparatus 160 and a Principal Apparatus 110, that an algorithm has determined that a match has occurred when applying conditions and preferences imposed by an agent, a principal and a user such as the ones described in FIG. 2 and FIG. 3 as examples.

Referring to FIG. 5, the method starts in block 510. In one possible implementation the method may comprise:
  receiving indicia of an ID user associated with User Apparatus and an ID agent associated with an Agent Apparatus (520); and
  determining whether User's Apparatus location and Agent's Apparatus location meet certain predetermined threshold criteria (530);
  determining whether conditions stored in at least one of Principal Agent Data Structure datagram and User Data Structure datagram apply (540); and
  sending indications to at least one of said User Apparatus, said Agent Apparatus and Principal Apparatus that a match has occurred (550).

For the purpose of the present invention, the threshold location associated with User Apparatus 165 and Agent Apparatus 160 is a factor that may change with the evolution of technology. Non limiting examples of "threshold" are: 1) being within a certain geofenced area as defined by current location techniques such as GPS or multilateration, 2) being within the radio range of a radio carrier such as Bluetooth, 3) subscribing to the same base station BS 135 or access point with a mobile apparatus and 4) the logging in with an RFID identity by using an RFID reader located in a certain location, for example a bar or a restaurant.

Figure 6:
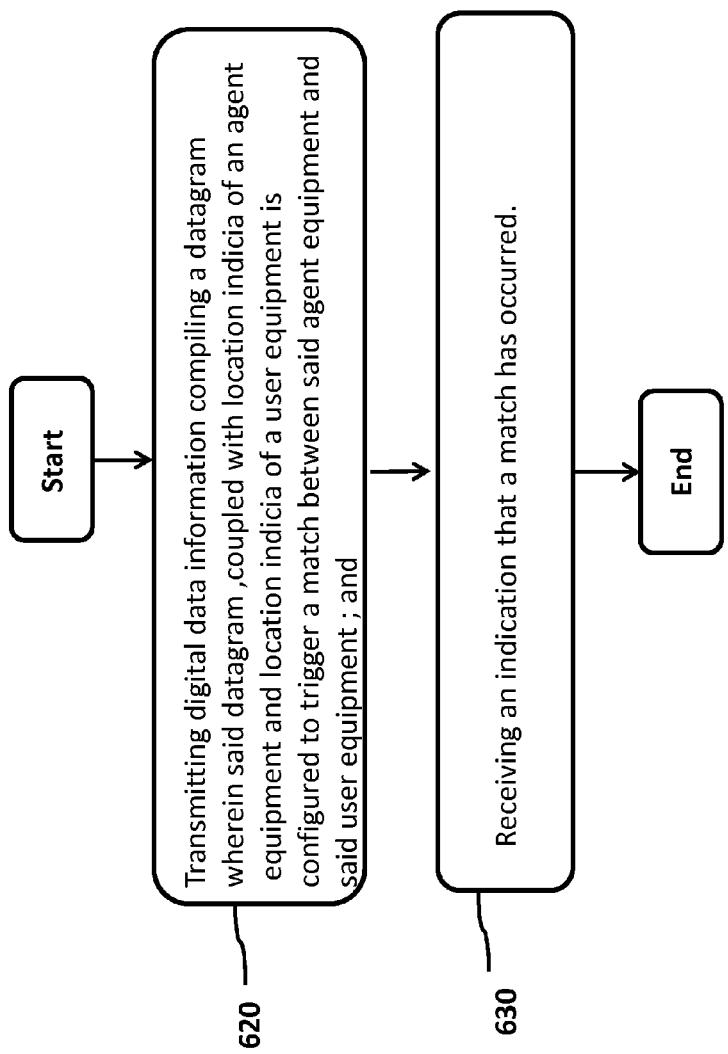
FIG. 6 is a flow diagram illustrating a process for triggering a notification that a match between an agent equipment and a user equipment has occurred.

FIG. 6 is an exemplary flow diagram illustrating a method for receiving indications at a Principal Equipment 110 that a match has occurred between an agent and a user said method comprising:
  transmitting digital data information compiling a datagram wherein said datagram, coupled with location indicia of an agent equipment and a user equipment can be used to trigger a match between said agent equipment and said user equipment (620); and
  receiving at least one indication that a match has occurred (630).

The person skilled in the art may recognize that in practice, a principal may only be interested in receiving indications that a user has accepted the offer that said principal has tendered by means of one of his agents; however, for an offer to be accepted a match should occur first, therefore indications of accepted offers are generally subsets of a broad-spectrum collection of matching occurrences. In addition, a principal may also receive indications that a match has occurred via a set of analytics describing his agents' performances. It may in fact be useful for a principal to know the match to transaction rate for his agents in order to evaluate their performances.

Figure 7:
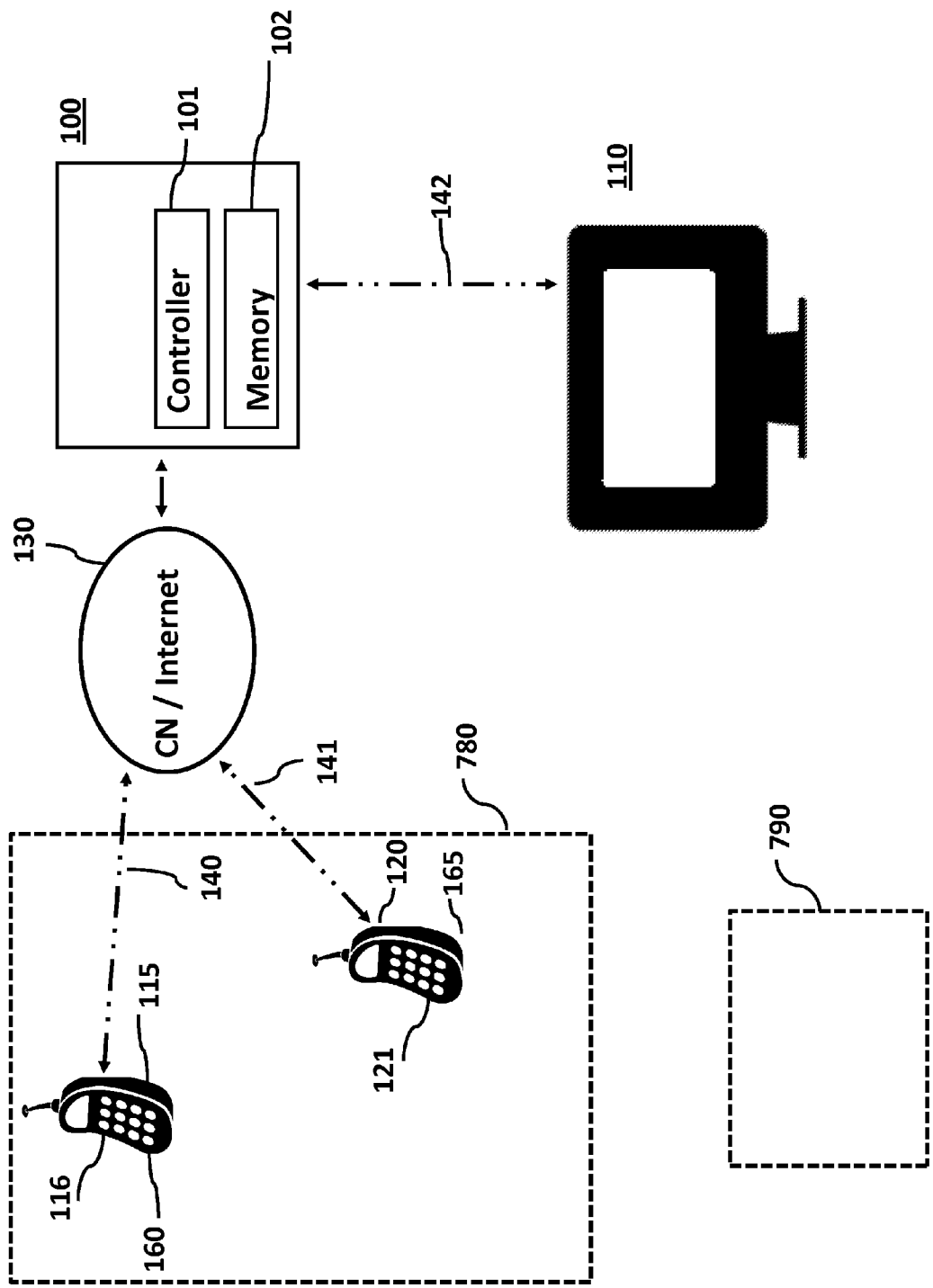
FIG. 7 describes an example system in accordance with another embodiment of the invention based on geofencing.

FIG. 7 represents one example embodiment of the invention based on geo-fencing technology. FIG. 7 is similar to FIG. 1 and therefore only the new elements and relevant modifications will be discussed. In this embodiment, the matching associated with the location parameter can be satisfied by the presence of both, User Equipment 165 and Agent Equipment 160, within an area defined by geo-fencing techniques, in this case Area 780. Area 780 can be an area defining the perimeter of a commercial mall or a portion thereof. In one implementation, locations with a higher density of users can be geofenced using small size areas while locations with a smaller density of users may be geofenced using bigger size areas to maintain a constant probability of matching users with agents. In one implementation, at least one of agent, principal or user or any combination thereof can define matching areas. In another implementation, if more than one actor can define the matching areas then the match may occur only within the overlapping portion of the areas.

In the embodiment described in FIG. 7, Agent Equipment 165 and User Equipment 160, satisfy the location portion of the matching algorithm stored in Memory 102 and running on Server 100. In one embodiment, after a match has occurred and both agent and user have been made aware of said occurrence via data and information sent over Cellular Link 141, Cellular Link 140 and Core Network (CN)/Internet 130, then Controller 101 may direct both agent and user to a meeting place such as Area 790. Such meeting place can be a commercial establishment such a coffee shop or any other place suitable for agent's demonstration and the showing of the product or service.

Figure 8:
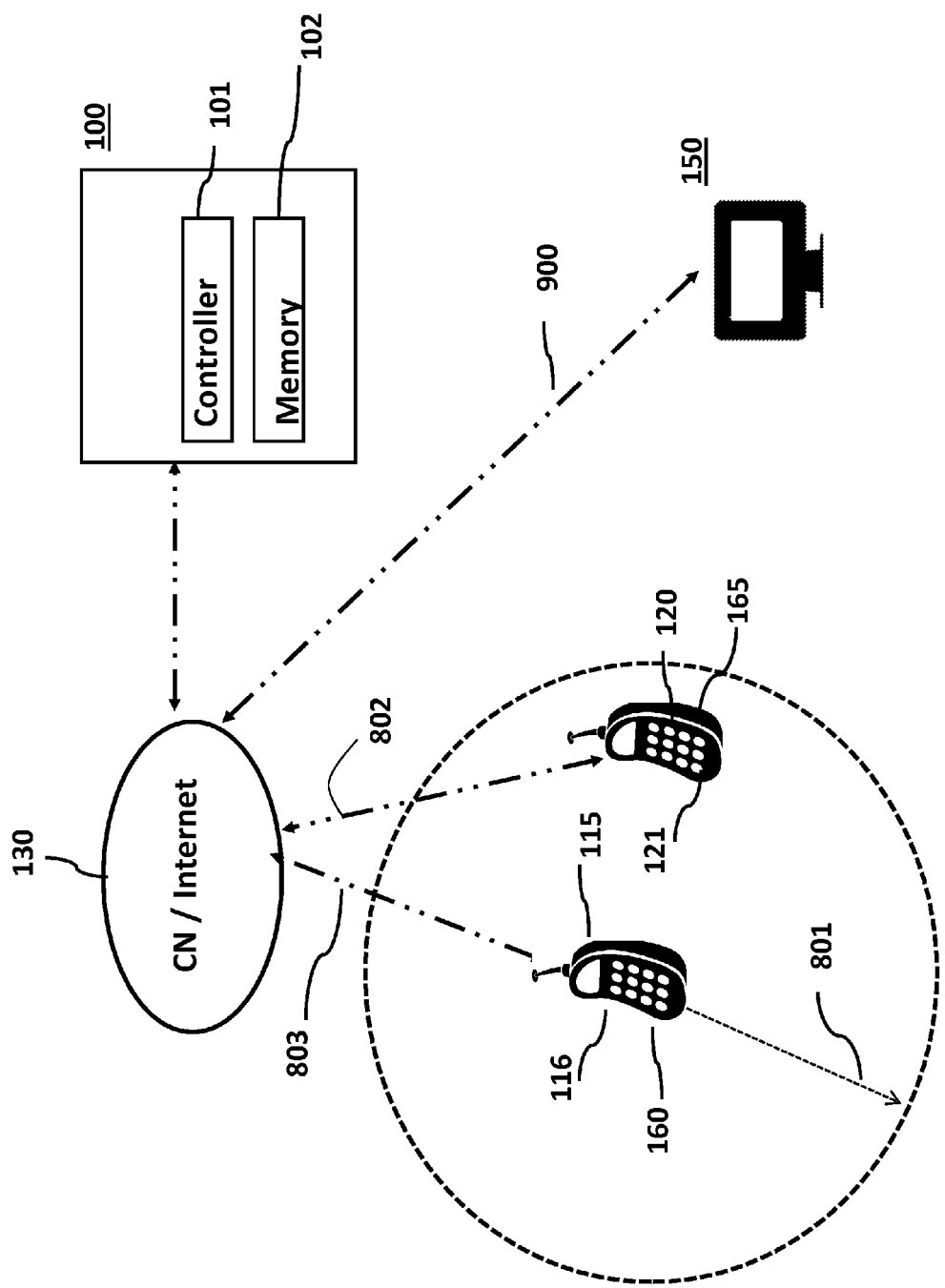
FIG. 8 describes an example system in accordance with another embodiment of the invention based on a distance value measured between the locations of agent apparatus and user apparatus.

FIG. 8 represents one example embodiment of the invention based on distance between User Equipment 165 and Agent Equipment 160. FIG. 8 is similar to FIG. 1 and FIG. 7 therefore only the new elements and relevant modifications will be discussed. In this embodiment, the location proximity element of the matching algorithm is satisfied when the distance between User Equipment 160 and Agent Equipment 165 is below a Threshold Distance 801. In one embodiment, Server 100 can request the position of User Equipment 160 and Agent Equipment 165. User Equipment 160 and Agent Equipment 165 may transmit their position using one of the many positioning technologies such as GPS, multilateration, cell ID mapping or other. In one embodiment said Threshold Distance 801 might vary with the density of users in a particular location. For example, if a number N of User Equipment 165 falls within Threshold Distance 801 and that number N is higher than <User MAX> then Threshold Distance 801 value may diminish to a set value <Min>. If N is smaller than <User MIN> then Threshold Distance 801 may increase to a preset value <Max>. The person skilled in the art will recognize that this is only one example and that other intermediate values for Threshold Distance 801, in addition to <Min> and <Max>, can be advantageously implemented. In case that more than one User Equipment within the Threshold Distance 801 triggers a match, an algorithm residing on Server 100 may resolve the conflict in many different ways, for example by privileging the closest User Equipment. Alternatively, it may use other parameters like the history of purchases of the matched users; it may privilege the user that has already closed the higher number of deals by using the process described. The person skilled in the art may recognize that there are many different ways of managing conflicts and that the examples presented are just a few of many possible ones.

Figure 9:
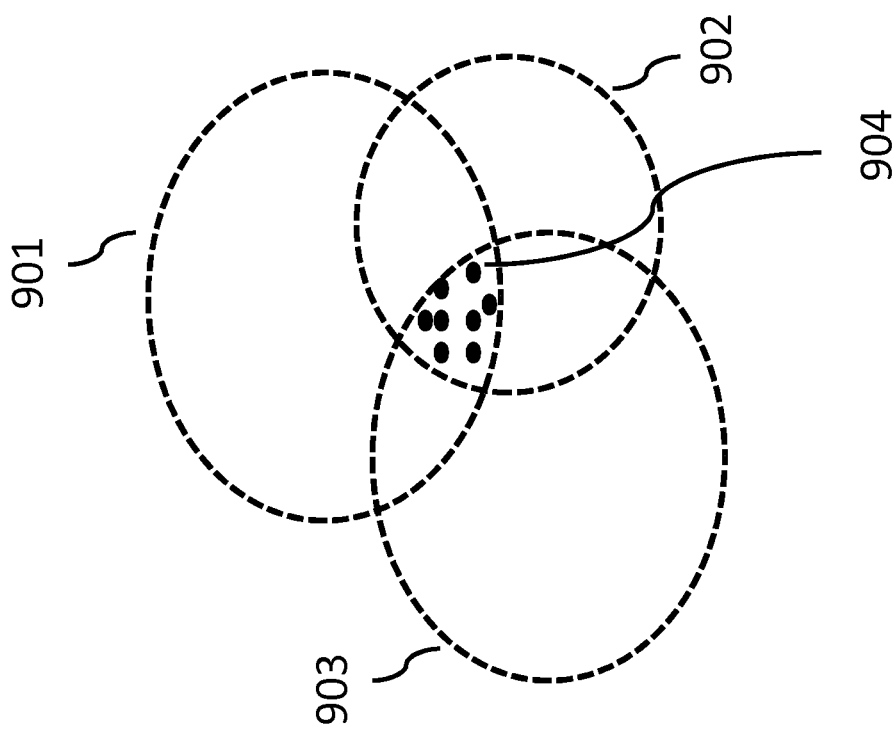
FIG. 9 describes a schematic illustration of the conditions necessary to trigger a "three-profiles" matching algorithm.

FIG. 9 describes a schematic representation of a three-profile based matching system, which is one of the possible implementations of the invention. In the figure, AGENT PROFILE 902 describes the profile of the agent, USER PROFILE 901 describes the profile of the user and PRINCIPAL PROFILE 903 describes the profile of the principal. As discussed with reference to FIG. 2, the datagram PRINCIPAL AGENT DATA STRUCTURE 200 can be seen as the combination of AGENT PROFILE 902 and PRINCIPAL PROFILE 903. For a match to occur at least some of the data and preferences contained in the datagram described as examples in FIG. 2 and FIG. 3 must overlap and be satisfied as in overlapping AREA 904.

In a possible implementation, there is a hierarchy between preferences and settings in the three profiles. By the very nature of a principal-agent relationship, the system may give some deference to choices and preferences of a principal. For example, a principal may be able to control the areas in which the matching algorithm should allow a match between agent and user to occur by restricting where Agent Equipment 160 can operate for the purposes of the invention described. A principal may enable or disable agents as described in FIG. 2. A principal is also the master of the offer so he may alter the offer terms and eventually alert the agents of any change. A principal may set a bottom-selling price for the agent, namely the price at which principal will sell the service or the good. Anything in excess could be profit for the agent. A principal may also set a hierarchy among agents and skew the matching algorithm output so that it will favor certain agents versus others in situations where different agents may compete for the same users.

In some implementations, agents may have a set of preferences and setting that they can choose. For example, an agent may bar matches around his home or workplace. He may also request the system to indicate where the closest matching user is located so that he can move close enough to allow the system to send an alert to said user when he is in proximity. Agents may also enable or disable their IDs as described in FIG. 2 when they decide to take time off from the described agency system.

In addition, the person skilled in the art will recognize that the three embodiments presented merely as examples and described in FIG. 1, FIG. 7 and FIG. 8 can be complementary. For example, a locationing method based on GPS technology can be used outdoor and the system may switch to another method based on the broadcasting of an ID, as the one described in FIG. 1, when indoor.

Embodiments of the present invention may be implemented in software, hardware, application logic or a combination of software, hardware and application logic. The software, application logic and/or hardware may reside on a user equipment, laptop, tablet, vehicle, access point, base station or radio node. If desired, part of the software, application logic and/or hardware may reside on a user equipment, laptop, tablet, or vehicle, part of the software, application logic and/or hardware may reside on an access point, base station or network node, and part of the software, application logic and/or hardware may reside on server or network node. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1, FIG. 7 and FIG. 8. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed as limiting. Rather, there are several variations and modifications that can be made without departing from the scope of the present invention as defined in the appended claims.

What is claimed is:

1. A machine implemented method for facilitating a prospective business transaction involving a principal, an agent, and a user comprising:
at least partially causing the generation of indicia that a first mobile equipment, that is associated with a user digital identifier, and a second mobile equipment, that is associated with an agent digital identifier, meet a location based criterion, as determined by using at least one microprocessor, wherein said generation of indicia is regulated by at least:
an agent-user matching algorithm using predefined data selected from the group consisting of: data indicating a proclivity of said user toward predetermined business transactions, data related to terms of said prospective business transaction, wherein said terms are controlled by said principal, data related to parameters associated to said prospective business transaction, wherein said parameters are controlled by said principal, data related to a brand that is associated with said agent, data related to preferences associated with said user, wherein said preferences are controlled by said user, data related to user generated keywords indicating an explicit interest toward a predefined product, data related to user generated keywords indicating an explicit interest toward a predefined service, data related to patterns associated with said user, data related to attributes associated with said user, data related to locations associated with said prospective business transaction, wherein said locations are controlled by said principal, and combinations thereof; and
a principal-controlled participation condition associated with said agent digital identifier wherein said principal-controlled participation condition selectably enables said second mobile equipment, associated with said agent digital identifier, to participate to said machine implemented method.

2. The method of claim 1, wherein said location based criterion consists in assessing if said first mobile equipment, associated with said user digital identifier, and said second mobile equipment, associated with said agent digital identifier, are contemporaneously located within a predefined area.

3. The method of claim 1, wherein said location based criterion consists in assessing if a data value related to the distance between said first mobile equipment and said second mobile equipment is below a predetermined threshold.

4. The method of claim 1, further comprising at least partially contributing to generating indicia related to a possible meeting location between said user and said agent, in mobile equipment selected from the group consisting of: said first mobile equipment, said second mobile equipment, and combinations thereof.

5. The method of claim 1, wherein said at least partially causing the generation of indicia is regulated by an availability data value associated with said principal, wherein said data value refers to items selected from the group consisting of: goods, services, and combinations thereof.

6. Mobile equipment comprising:
an indicator configured to provide an indication that said mobile equipment, associated with a user digital identifier, and a second mobile equipment, associated with an agent digital identifier, meet a location based criterion, wherein said location based criterion facilitates a prospective business transaction involving a principal, an agent, and a user and said indication is regulated by at least:
an agent-user matching algorithm using predefined data selected from the group consisting of: data indicating a proclivity of said user toward predetermined business transactions, data related to terms of said prospective business transaction, wherein said terms are controlled by said principal, data related to parameters associated to said prospective business transaction, wherein said parameters are controlled by said principal, data related to a brand that is associated with said agent, data related to preferences associated with said user, wherein said preferences are controlled by said user, data related to user generated keywords indicating an explicit interest toward a predefined product, data related to user generated keywords indicating an explicit interest toward a predefined service, data related to patterns associated with said user, data related to attributes associated with said user, data related to locations associated with said prospective business transaction, wherein said locations are controlled by said principal, and combinations thereof; and
a principal-controlled participation condition associated with said agent digital identifier, wherein said principal-controlled participation condition selectably enables said second mobile equipment associated with said agent digital identifier to participate to said machine implemented method.

7. The mobile equipment of claim 6, further comprising an input-output module configured to facilitate the advancement of said prospective business transaction via functionalities selected from the group consisting of: a preliminary acceptance of said prospective business transaction functionality, a threshold number of acceptances of said prospective business transaction functionality, a multiple agents load distribution functionality, and combinations thereof.

8. Apparatus comprising at least one processor; and at least one memory including computer program code; the at least one memory and the computer program code configured to, with the at least one processor, cause the generation of indicia that a first mobile equipment, that is associated with a user digital identifier, and a second mobile equipment, that is associated with an agent digital identifier, meet a predefined location based criterion in a machine implemented method to facilitate a prospective business transaction involving a principal, an agent, and a user, wherein said generation of indicia is regulated by at least:
a) an agent-user matching algorithm using predefined data selected from the group consisting of: data indicating a proclivity of said user toward predetermined business transactions, data related to terms of said prospective business transaction, wherein said terms are controlled by said principal, data related to parameters associated to said prospective business transaction, wherein said parameters are controlled by said principal, data related to a brand that is associated with said agent, data related to preferences associated with said user, wherein said preferences are controlled by said user, data related to user generated keywords indicating an explicit interest toward a predefined product, data related to user generated keywords indicating an explicit interest toward a predefined service, data related to patterns associated with said user, data related to attributes associated with said user, data related to locations associated with said prospective business transaction, wherein said locations are controlled by said principal, and combinations thereof; and
b) a principal-controlled participation condition, wherein said principal-controlled participation condition selectably enables said second mobile equipment, associated with said agent digital identifier, to participate to said machine implemented method.

9. The apparatus of claim 8, wherein said generation of indicia is regulated by means of an availability data value associated with said principal, wherein said data value refers to items selected from the group consisting of: goods, services, and combinations thereof.

10. A computer software system having a set of instructions stored in a non-transitory computer-readable medium for controlling at least one general-purpose digital computer in performing desired functions that are necessary to execute a machine implemented method for facilitating a prospective business transaction involving a principal, an agent, and a user, said set of instructions comprising instructions formed into a plurality of modules, said plurality of modules comprising:
a) a process for causing the generation of indicia that a first mobile equipment, that is associated with a user digital identifier, and a second mobile equipment, that is associated with an agent digital identifier, meet a location based criterion;
b) a process for regulating said causing the generation of indicia that said location based criterion is met via an agent-user matching algorithm, wherein said algorithm is using predefined data selected from the group consisting of: data indicating a proclivity of said user toward predetermined business transactions, data related to terms of said prospective business transaction, wherein said terms are controlled by said principal, data related to parameters associated to said prospective business transaction, wherein said parameters are controlled by said principal, data related to a brand that is associated with said agent, data related to preferences associated with said user, wherein said preferences are controlled by said user, data related to user generated keywords indicating an explicit interest toward a predefined product, data related to user generated keywords indicating an explicit interest toward a predefined service, data related to patterns associated with said user, data related to attributes associated with said user, data related to locations associated with said prospective business transaction, wherein said locations are controlled by said principal, and combinations thereof; and c) a process for regulating participation of said agent via a principal-controlled participation condition, wherein said principal-controlled participation condition selectably enables said second mobile equipment, associated with said agent digital identifier, to participate to said machine implemented method.

11. The computer software system of claim 10, wherein said location based criterion consists in determining if said first mobile equipment, that is associated with said user digital identifier, and said second mobile equipment, that is associated with said agent digital identifier, are positioned within a predefined area.

12. The computer software system of claim 10, wherein said location based criterion consists in determining if a data value representative of the distance between said first mobile equipment and said second mobile equipment is below a predetermined threshold.

13. The computer software system of claim 10, further comprising:
a process for causing the generation of indicia associated with a meeting location between said user and said agent in mobile equipment selected from the group consisting of: said first mobile equipment, said second mobile equipment, and combinations thereof.

14. The computer software system of claim 10, further comprising:
a process for regulating said causing the generation of indicia by means of an inventory data value that is associated with said principal.

15. The computer software system of claim 10, further comprising:
a process for causing the generation of indicia that said prospective business transaction has reached at least a predefined milestone selected from the group consisting of: said prospective business transaction has been transacted, said business transaction has been preliminarily accepted by said user, an indication of the nearby presence of said agent has been delivered to said user, an indication of the nearby presence of said user has been delivered to said agent, and combinations thereof.

16. The computer software system of claim 10, further comprising:
a process for regulating said causing the generation of indicia via a location based partition arrangement associated with said principal, wherein said agent digital identifier is one of a plurality of agent digital identifiers meeting said principal-controlled participation condition and said agent digital identifier is assigned one out of a plurality of areas resulting from said partition.

17. An apparatus comprising:
means for storing, in at least one non-transitory computer-readable medium, computer program code adapted to facilitate, at least in part, a machine implemented method for advancing a prospective business transaction involving a principal, an agent, and a user; and means for causing the generation of indicia that a first mobile equipment, that is associated with a user digital identifier, and a second mobile equipment, that is associated with an agent digital identifier, meet a location based criterion, wherein said causing the generation of indicia is regulated by at least:

an agent-user matching algorithm using predefined data selected from the group consisting of: data indicating a proclivity of said user toward predetermined business transactions, data related to terms of said prospective business transaction, wherein said terms are controlled by said principal, data related to parameters associated to said prospective business transaction, wherein said parameters are controlled by said principal, data related to a brand that is associated with said agent, data related to preferences associated with said user, wherein said preferences are controlled by said user, data related to user generated keywords indicating an explicit interest toward a predefined product, data related to user generated keywords indicating an explicit interest toward a predefined service, data related to patterns associated with said user, data related to attributes associated with said user, data related to locations associated with said prospective business transaction, wherein said locations are controlled by said principal, and combinations thereof; and a principal-controlled participation condition, wherein said principal-controlled participation condition selectably enables said second mobile equipment associated with said agent digital identifier to participate in said machine implemented method for advancing said business transaction.

18. The apparatus of claim 17, wherein said causing the generation of indicia is further regulated by an inventory level data value associated with said principal wherein said data value refers to items selected from the group consisting of: goods, services, and combinations thereof.

19. The apparatus of claim 17 further comprising, means for causing the generation of indicia to facilitate meeting said location based criterion, wherein said indicia are generated in mobile equipment selected from the group consisting of: said first mobile equipment, said second mobile equipment, and combinations thereof.

20. The apparatus of claim 17, wherein said causing the generation of indicia is additionally regulated by program code, stored on said one non-transitory computer-readable medium, that is adapted to enable a prioritization scheme among agent digital identifiers, wherein said agent digital identifier is one of a plurality of agent digital identifiers that meet said principal-controlled participation condition.

* * * * *